US012711002B2

(12) United States Patent
Liu et al.

(10) Patent No.: US 12,711,002 B2
(45) Date of Patent: Aug. 18, 2026

(54) GENERATING SYNTHETIC DATA FOR TRAINING LLMS WITH TOOL-BASED API CAPABILITIES

(71) Applicant: GOOGLE LLC, Mountain View, CA (US)

(72) Inventors: Fei Liu, Mountian View, CA (US); Christopher Thomas Hidey, New York, NY (US); Pavankumar Reddy Muddireddy, Santa Clara, CA (US); Rahul Goel, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 104 days.

(21) Appl. No.: 18/438,185

(22) Filed: Feb. 9, 2024

(65) Prior Publication Data

US 2025/0258723 A1 Aug. 14, 2025

(51) Int. Cl.
*G06F 9/54* (2006.01)
*G06F 40/40* (2020.01)
*G06N 3/0455* (2023.01)

(52) U.S. Cl.
CPC .............. *G06F 9/543* (2013.01); *G06F 40/40* (2020.01); *G06N 3/0455* (2023.01)

(58) Field of Classification Search
CPC .......... G06F 40/40; G06F 40/30; G06F 40/20; G06N 3/0455
See application file for complete search history.

(56) References Cited

U.S. PATENT DOCUMENTS

2023/0135179 A1 5/2023 Mielke et al.
2023/0168871 A1* 6/2023 Mcgrath .................. G06F 8/35 717/104

(Continued)

FOREIGN PATENT DOCUMENTS

EP 4283546 A1 11/2023

OTHER PUBLICATIONS

BLEU: a Method for Automatic Evaluation of Machine Translation; Kishore Papineni, Salim Roukos, Todd Ward, and Wei-Jing Zhu Proceedings of the 40th Annual Meeting of the Association for Computational Linguistics (ACL), Philadelphia, Jul. 2002, pp. 311-318. (Year: 2002).*

(Continued)

*Primary Examiner* — Michael N Opsasnick
(74) *Attorney, Agent, or Firm* — Gray Ice Higdon

(57) ABSTRACT

Implementations relate to generating a plurality of training instances to train a generative model in performing tasks using external tool(s)/service(s) accessible via corresponding API(s). The plurality of training instances each includes a synthetic natural language user instruction and execution step(s) to perform a task (e.g., a single-API task or a multi-API task) specified in the synthetic natural language user instruction. The synthetic natural language user instructions selected for the synthetic training data can be generated based on processing textual prompt(s) using a first LLM, where the textual prompt(s) can each include a list of APIs and associated API documents, one or more seed examples, and a request to synthesize a natural language user instruction. The one or more execution steps for a corresponding synthetic natural language user instruction can be generated based on parsing the corresponding synthetic natural language user instruction using the first LLM or a second LLM.

20 Claims, 6 Drawing Sheets

(56) References Cited

U.S. PATENT DOCUMENTS

| | | | | |
|---|---|---|---|---|
| 2023/0259714 | A1 | 8/2023 | Lange | |
| 2023/0385026 | A1* | 11/2023 | El Hattami | G06F 8/30 |
| 2024/0045742 | A1* | 2/2024 | Sagar | G06F 9/543 |
| 2024/0111960 | A1* | 4/2024 | Earle | G06F 40/35 |
| 2024/0311579 | A1* | 9/2024 | Dong | G06F 40/284 |
| 2024/0370476 | A1* | 11/2024 | Madisetti | G06F 16/3329 |
| 2024/0420453 | A1* | 12/2024 | Gupta | G06F 40/30 |
| 2025/0104693 | A1* | 3/2025 | Papayiannis | G10L 13/10 |
| 2025/0110811 | A1* | 4/2025 | Mishchenko | G06F 9/451 |
| 2025/0111192 | A1* | 4/2025 | Bayless | G06N 3/006 |
| 2025/0166288 | A1* | 5/2025 | Perel | G06T 15/20 |
| 2025/0217351 | A1* | 7/2025 | Tan | G06F 16/2423 |

OTHER PUBLICATIONS

Song et al., "RestGPT: Connecting Large Language Models with Real-World RESTful APIs" arXiv:2306.06624v2 [cs.CL] 25 pages, dated Aug. 27, 2023.

Anonymous Andy, et al.; Using large language models (LLMs) to synthesize training data; Amazon Science; retrieved from the internet: URL:https://web.archive.org/web/20231003045243/https://www.amazon.science/blog/using-large-language-models-llms-to-synthesize-training-data; 15 pages; dated Jan. 20, 2023.

European Patent Office; International Search Report and Written Opinion issued in Application No. PCT/2025/014987; 14 pages; dated Apr. 28, 2025.

* cited by examiner

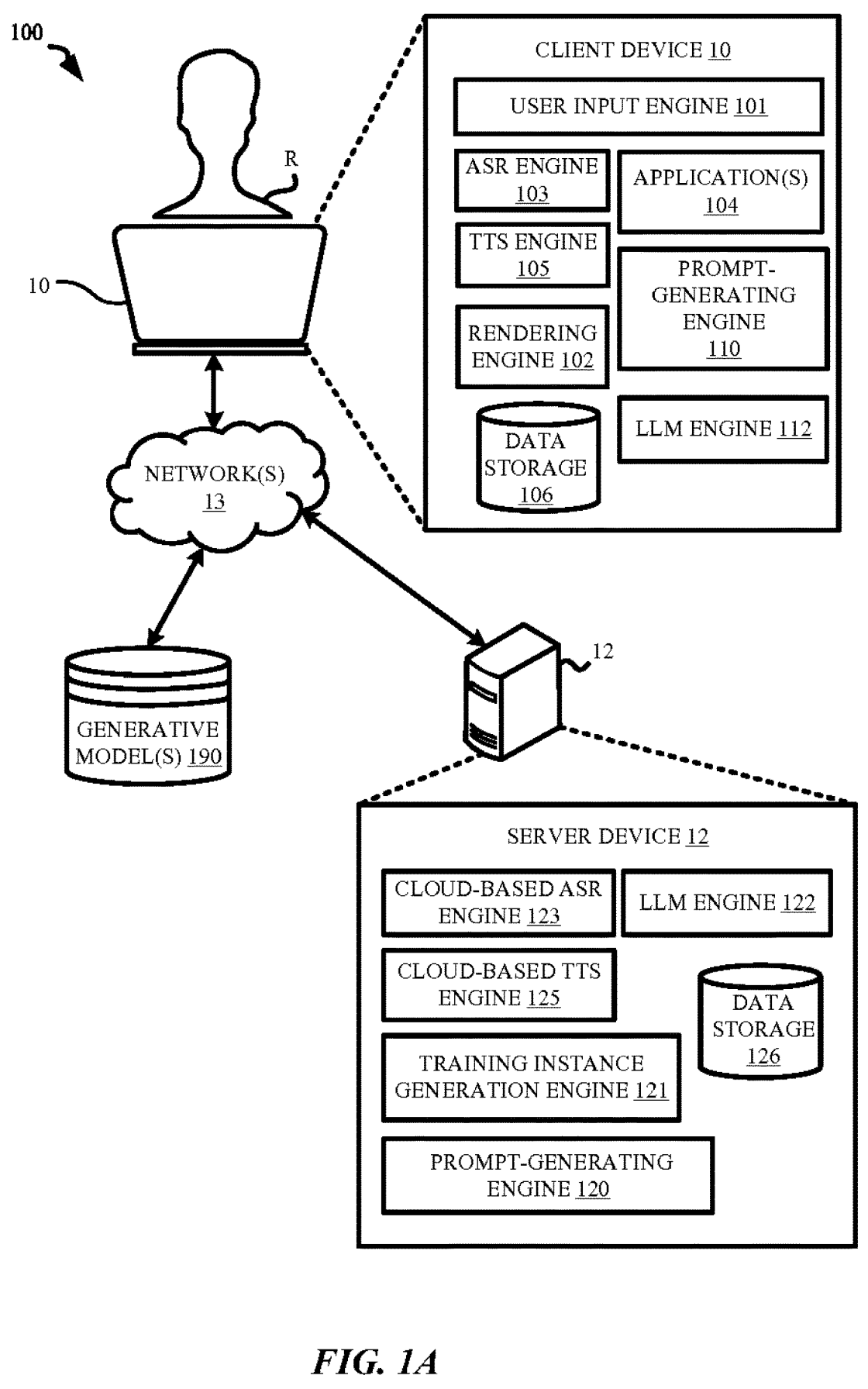

100

R

10

CLIENT DEVICE 10

USER INPUT ENGINE 101

ASR ENGINE 103

APPLICATION(S) 104

TTS ENGINE 105

PROMPT-GENERATING ENGINE 110

RENDERING ENGINE 102

DATA STORAGE 106

LLM ENGINE 112

NETWORK(S) 13

GENERATIVE MODEL(S) 190

12

SERVER DEVICE 12

CLOUD-BASED ASR ENGINE 123

LLM ENGINE 122

CLOUD-BASED TTS ENGINE 125

DATA STORAGE 126

TRAINING INSTANCE GENERATION ENGINE 121

PROMPT-GENERATING ENGINE 120

*FIG. 1A*

GENERATING SYNTHETIC DATA FOR TRAINING LLMS WITH TOOL-BASED API CAPABILITIES

BACKGROUND

Large language models (LLMs) are transformer-based neural networks with applications in various domains and fields. For example, LLM(s) have been developed and can be used to process natural language (NL) content and/or other input(s), to generate LLM output that reflects generative NL content and/or other generative content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section".

While capable of generating natural language content responsive to user input as described above, LLMs are less capable of leveraging tools or services via application programming interfaces (APIs, e.g., an email API) to perform a task (e.g., change DNS settings on Acme router as described above, or send an email). This is due to the fact that existing training of LLMs primarily focuses on textual data and also, in part due to the lack of available training instances that trains the LLMs to make use of external tools or services. As a result, the capability of the LLMs in performing and handling complex tasks with the help of external tools or services needs more development.

SUMMARY

Implementations disclosed herein relate to generating and/or utilizing synthetic training data to train a generative model (e.g., a large language model, "LLM") for use in performing tasks using external tool(s) or service(s) accessible via corresponding API(s). Generating synthetic training data according to implementations disclosed herein enables generation of diverse training instances for various tool(s) accessible via corresponding API(s) without necessitating burdensome (e.g., computationally burdensome) manual creation of the training data and without requiring training data be generated from past attempts at utilizing the API(s). In these and other manners synthetic training data for a new API can be quickly generated and used to train a generative model for enabling interaction with the new API. Generated synthetic training data can reflect interaction with various APIs and can relate to various technical tasks that are achievable via interaction with the APIs. In these and other manners, a generative model can be trained, based on such diverse training instances, to enable the generative model to be utilized in effective interaction with various API(s) in accomplishing various technical task(s).

In various implementations, a list of application programming interfaces (APIs) are identified or selected, and for each API in this list of APIs, a corresponding API document that describes a respective API is identified and retrieved. The API document for utilization of the respective API, for instance, can be a structured documentation file that includes: a description of API endpoint(s) (also referred to as "resource(s)", which can be data object(s) such as movies, messages, or service(s)) accessible via the respective API, and a path (e.g., a uniform resource locator, "URL") to the API endpoint(s). The API document can further include an operation ID for an operation (e.g., HTTP method such as "POST", "GET", "DELETE") to be performed on the resources (which, for instance, may be accessible over HTTP protocol) of the respective API, and a parameter list that lists parameters with their names ("language", "region"), data types ("string" "integer"), and parameter descriptions. The API document can further include response format (e.g., JSON) and schema, authentication method, and/or other information (e.g., error codes and descriptions for the error codes) of the respective API.

The list of APIs, for example, can include a first API for retrieving data from a particular content-sharing platform, and/or a second API for sending emails, etc. As another example, the list of APIs can include a first group of APIs, and/or a second group of APIs. In this latter example, the first group of APIs can include one or more APIs for collaboratively performing a first task, and the second group of APIs can include one or more additional APIs for collaboratively performing a second task. The one or more additional APIs can be completely or partially different from the one or more APIs. Alternatively, the one or more additional APIs can be a subset of the one or more APIs, or vice versa. Descriptions of the list of APIs are not limited herein. For instance, the list of APIs can be APIs collected from one or more API resources (e.g., two different API resources, three different API resources, etc.) and can be updated based on APIs available from the one or more API resources.

Given the list of APIs and API documents for the list of APIs, one or more textual prompts for synthesizing user instructions can be generated, where the synthesized user instructions can be applied to form part of the aforementioned synthetic training data. The one or more textual prompts for synthesizing user instructions can include a first textual prompt for synthesizing user instructions. The first textual prompt for synthesizing user instructions can include, for instance, the list of APIs, the API documents for the list of APIs (or content of the API documents), and a request (in natural language) to generate a user instruction for performing a task using a single tool/API from the list of APIs. The request, for instance, can be "generate a user instruction for performing a task using a single API from the provided APIs".

In some implementations, the first textual prompt can further include one or more manually curated seed examples that demonstrate generation of desired user instruction(s) for performing desired task(s), where each of the desired task(s) can be performed using a single tool/API. In this case, the request in the first textual prompt can be, for instance, "given the above seed examples, generate a user instruction for performing a task using a single API from the provided APIs".

The one or more manually curated seed examples, for instance, can include a first manually curated seed example. The first manually curated seed example can demonstrate generation of a first example user instruction such as "set the temperature to 70", given a first set of APIs that at least include a thermostat API, and given a first set of API documents identified for the first set of APIs (which include an API document for the thermostat API). The first set of APIs in the first manually curated seed example can be, but does not necessarily need to be, a subset of the aforementioned list of APIs that are used for synthesizing user instructions. Alternatively or additionally, the one or more manually curated seed examples can include a second manually curated seed example. The second manually curated seed example can demonstrate generation of a second example user instruction such as "text my parents and daughter", given a second set of APIs that at least includes a voice call API, and given a second set of API documents for the second set of APIs. The second set of APIs in the second manually curated seed example can be, but does not necessarily need to be, a subset of the aforementioned list of APIs that are used for synthesizing user instructions. The second set of APIs can be the same as, or different from the first set of APIs.

Alternatively or additionally, the one or more textual prompts for synthesizing user instructions can include a second textual prompt for synthesizing user instructions. The second textual prompt for synthesizing user instructions can include, for instance, the list of APIs, the API documents for the list of APIs (or content of the API documents), and a request (in natural language) to generate a user instruction for performing a task using multiple tools (e.g., APIs). The request in the second textual prompt, for instance, can be "generate a user instruction for performing a task using two or more APIs from the above list of APIs".

Optionally, in some implementations, the second textual prompt can further include one or more additional manually curated seed examples that demonstrate generation of desired user instruction(s) for performing additionally desired task(s), where each of the additionally desired task(s) is performed using multiple tools (e.g., APIs). The one or more additional manually curated seed examples, for instance, can include a first additional manually curated seed example. The first additional manually curated seed example can demonstrate generation of an example user instruction such as "turn on the light and set the temperature to 70", given a set of APIs that at least include a lighting API and a thermostat API, and given a set of API documents identified for the set APIs (which include an API document for the lighting API and an API document for the thermostat API). The set of APIs in the first additional manually curated seed example can be, but does not necessarily need to be, a subset of the aforementioned list of APIs that are used for synthesizing user instructions. The one or more additional manually curated seed examples can, alternatively or additionally, include a second additional manually curated seed example, a third additional manually curated seed example, etc. The present disclosure is not limited thereto.

In some implementations, the aforementioned first textual prompt for synthesizing user instructions can be processed, using a first trained large language model (LLM), to generate one or more synthetic natural language user instructions that each describes a single-tool (e.g., single-API) task to be performed. For example, the first textual prompt for synthesizing user instructions can be processed, using the first trained LLM, for one or more iterations. During each of the one or more iterations, the first textual prompt for synthesizing user instructions can be processed as input, using the first trained LLM, to generate a corresponding synthetic natural language user instruction that describes a corresponding single-tool (e.g., single-API) task to be performed. This way, the more iterations the first textual prompt is processed using the first trained LLM, the higher the total number of synthetic natural language user instructions generated.

Optionally, the total number, order, and/or content of manually curated seed examples included in the first textual prompt can be varied or modified. By varying the total number, order, and/or content of manually curated seed examples included in the first textual prompt, the diversity in the generated synthetic natural language user instructions can be increased.

In some implementations, the first textual prompt for synthesizing user instructions can be processed, for instance, using the first trained LLM, for a total number of m iterations, to generate a first synthetic natural language user instruction $A_1$ that describes a first single-API task to be performed, a second synthetic natural language user instruction $A_2$ that describes a second single-API task to be performed, . . . , and an $m^{th}$ synthetic natural language user instruction $A_m$ that describes an $m^{th}$ single-API task to be performed. Each synthetic natural language user instruction (e.g., $A_1$, $A_2$ . . . , $A_m$) that describes a corresponding single-API task to be performed, for instance, may not explicitly identify the single API via which the corresponding single-API task is to be performed. But this is not required, and in some cases, a synthetic natural language user instruction that describes a corresponding single-API task to be performed can explicitly identify the single API via which the single-API task is to be performed. It is noted that "m" can be any positive integer greater than or equal to "1". For instance, "m" can be in the order of tens, hundreds, tens of hundreds, or more.

Alternatively or additionally, the aforementioned second textual prompt for synthesizing user instructions can be processed, using the first trained LLM, to generate one or more additional synthetic natural language user instructions that each describes a multi-tool (e.g., multi-API) task to be performed. For example, the second textual prompt for synthesizing user instructions can be processed, using the first trained LLM, for one or more iterations. During each of the one or more iterations, the second textual prompt for synthesizing user instructions can be processed as input, using the first trained LLM, to generate a corresponding synthetic natural language user instruction that describes a corresponding multi-tool (e.g., multi-API) task to be performed.

For instance, the second textual prompt for synthesizing user instructions can be processed, using the first trained LLM, for a total number of n iterations, to generate a first synthetic natural language user instruction $B_1$ that describes a first multi-API task to be performed, a second synthetic natural language user instruction $B_2$ that describes a second multi-API task to be performed, . . . , and an $n^{th}$ synthetic natural language user instruction $B_n$ that describes an $n^{th}$ multi-API task to be performed. Each synthetic natural language user instruction (e.g., $B_1$, $B_2$, . . . $B_n$) that describes a corresponding multi-API task to be performed, for instance, may not explicitly identify the multiple APIs via which the corresponding multi-API task is to be performed. But this is not required, and in some cases, a synthetic natural language user instruction that describes a corresponding multi-API task to be performed can explicitly identify the multiple APIs via which the multi-API task is to be performed. It is noted that "n" can be the same as, or different from "m", and can be any positive integer greater than or equal to "1". For instance, "n" can be in the order of tens, hundreds, tens of hundreds, or more.

In some implementations, optionally, the first trained LLM can be acquired by training or fine-tuning a first pre-trained LLM based on a first set of manually curated training instances. Optionally, the first set of manually curated training instances can each include, as training instance input, one or more APIs, one or more API documents respectively associated with the one or more APIs, and a request to generate a natural language user instruction for performing a single-API or multi-API task based on the one or more APIs and the one or more API documents. Correspondingly, the first set of manually curated training instances can each include, as ground truth output, a ground truth natural language user instruction that is to perform a single-API task or multi-API task. In this case, parameters of the first pre-trained LLM can be adjusted or fine-tuned (to become parameters of the first trained LLM) based on comparing the ground truth output with a corresponding training instance output generated by processing the training instance input using the first pre-trained LLM. Alternatively or additionally, the first trained LLM can be acquired based on enabling the first pre-trained LLM to perform in-context learning using seed example(s) presented in training prompts (similar to those described above as "first or second textual prompt").

In some implementations, optionally, a dataset of synthetic user instructions can be created to include in the aforementioned first synthetic natural language user instruction ($A_1$) that describes a first single-API task to be performed, the second synthetic natural language user instruction ($A_2$) that describes the second single-API task to be performed, . . . , and an $m^{th}$ synthetic natural language user instruction ($A_m$) that describes the $m^{th}$ single-API task to be performed. Alternatively or additionally, the dataset of user instructions can include the aforementioned first synthetic natural language user instruction ($B_1$) that describes the first multi-API task to be performed, the second synthetic natural language user instruction ($B_2$) that describes the second multi-API task to be performed, . . . , and the $n^{th}$ synthetic natural language user instruction ($B_n$) that describes the $n^{th}$ multi-API task to be performed.

In some implementations, a second trained LLM can be utilized to parse one or more synthetic natural language user instructions from the aforementioned dataset of user instructions. The second trained LLM can be the same as, or different from the first trained LLM. In some implementations, for instance, an input prompt $P_{Am}$ can be generated based on the $m^{th}$ synthetic natural language user instruction ($A_m$) that describes the $m^{th}$ single-API task to be performed. The input prompt $P_{Am}$ can include, for instance, the $m^{th}$ synthetic natural language user instruction ($A_m$) that describes the $m^{th}$ single-API task and a request to formulate corresponding execution steps. The request to formulate corresponding execution steps can be, but does not necessarily need to be, "parse the natural language user instruction above to generate execution steps that fulfill task(s) specified in the natural language user instruction" or "parse the natural language user instruction above to iteratively generate execution steps that fulfill task(s) specified in the natural language user instruction".

Optionally, the input prompt $P_{Am}$ can identify API(s) responsive to the $m^{th}$ synthetic natural language user instruction, and/or description(s) for the identified API(s). The description(s) for the identified API(s) can be API document(s) for the identified API(s) or a portion (e.g., a one-sentence short description of function or features of a given API) thereof. Optionally, an API responsive to the $m^{th}$ synthetic natural language user instruction can be identified based on a description of the API matching the $m^{th}$ synthetic natural language user instruction. The input prompt $P_{Am}$ can be processed using the second trained LLM, to generate one or more execution steps for fulfilling the $m^{th}$ single-API task. The one or more execution steps, for instance, can be in the form of one or more API invocation calls, or can include one or more API invocation calls.

Optionally, in some implementations, the $m^{th}$ synthetic natural language user instruction ($A_m$) that describes the $m^{th}$ single-API task to be performed, can be processed iteratively using the second trained LLM, to generate the list of execution steps. For instance, the $m^{th}$ synthetic natural language user instruction ($A_m$) that describes the $m^{th}$ single-API task to be performed, can be processed as a first input using the second trained LLM for a first iteration/time, to generate a first API call ("first execution step"). Based on the first API call, a first API response can be received/determined. The $m^{th}$ synthetic natural language user instruction ($A_m$) that describes the $m^{th}$ single-API task to be performed, the first API call, and the first API response, can be processed as a second input using the second trained LLM for a second iteration/time, to generate a second API call ("second execution step"). Execution of the second API call can result in a second API response. The $m^{th}$ synthetic natural language user instruction ($A_m$) that describes the $m^{th}$ single-API task to be performed, the second API call, and the second API response, can be processed as a third input using the second trained LLM for a third iteration/time, to generate a third API call ("first execution step"), using which a third API response can be determined. This process/iteration can be repeated until the $m^{th}$ single-API task is performed or until a maximum number of iterations is reached. The first, second, and/or third API calls (and more API calls, if there is any) can all be directed to the same API to perform the single-API task. Optionally, a subset of the API calls (e.g., turn on security camera 1 and turn on security camera 2, where security cameras 1 and 2 are controllable using the same API) can be performed in parallel, or can be performed in a certain order.

As another example, an input prompt $P_{Bn}$ can be generated based on the $n^{th}$ synthetic natural language user instruction ($B_n$) that describes the $n^{th}$ multi-API task to be performed. The input prompt $P_{Bn}$, for instance, can include the $n^{th}$ synthetic natural language user instruction ($B_n$) that describes the $n^{th}$ multi-API task, and can include the request to formulate corresponding execution steps. The request to formulate corresponding execution steps can be, but does not necessarily need to be, "parse the natural language user instruction above to generate execution steps that fulfill task(s) specified in the natural language user instruction", or "parse the natural language user instruction above to iteratively generate execution steps that fulfill task(s) specified in the natural language user instruction".

Optionally, the input prompt $P_{Bn}$ can identify API(s) responsive to the $n^{th}$ synthetic natural language user instruction, and/or description(s) for the identified API(s). The description(s) for the identified API(s) can be API document(s) for the identified API(s) or a portion thereof. Optionally, an API responsive to the $n^{th}$ synthetic natural language user instruction can be identified based on a description of the API matching the $n^{th}$ synthetic natural language user instruction. The input prompt $P_{Bn}$ can be processed as input using the second trained LLM, to generate a list of execution steps. The list of execution steps, for instance, can be in the form of API invocation calls or can include one or more API invocation calls.

Optionally, in some implementations, the $n^{th}$ synthetic natural language user instruction ($B_n$) that describes the $n^{th}$ multi-API task to be performed, can be processed iteratively using the second trained LLM, to generate the list of execution steps. For instance, the $n^{th}$ synthetic natural language user instruction ($B_n$) that describes the $n^{th}$ multi-API task to be performed, can be processed as a first prompt/input using the second trained LLM for a first iteration/time, to generate a first API call ("first execution step"). Based on the first API call, a first API response can be received/determined. The $n^{th}$ synthetic natural language user instruction ($B_n$) that describes the $n^{th}$ multi-API task to be performed, the first API call, and the first API response, can be processed as a second prompt/input using the second trained LLM for a second iteration/time, to generate a second API call ("second execution step"). Execution of the second API call can result in a second API response. The $n^{th}$ synthetic natural language user instruction ($B_n$) that describes the $n^{th}$ multi-API task to be performed, the second API call, and the second API response, can be processed as a third prompt/input using the second trained LLM for a third iteration/time, to generate a third API call ("first execution step"), using which a third API response can be determined. This process/iteration can be repeated until the $n^{th}$ multi-API task is performed or until a maximum number of iterations is reached. The first, second, and/or third API calls (and more API calls, if there are any) can be directed to different APIs that are to collaboratively perform the multi-API task. Optionally, a subset of the API calls (e.g., calling a cloud storage API to retrieve a file and calling a message API to generate a message with the retrieved file attached, etc.) can be performed in a certain order. Optionally, another subset of the API calls can be performed in parallel.

In some implementations, a plurality of synthetic tool-use training instances can be generated based on the synthetic natural language user instructions from the dataset of synthetic user instructions and/or based on execution step(s) generated (e.g., using the second trained LLM) for each of the synthetic user instructions. For instance, the execution step(s) generated (e.g., using the second trained LLM) for each of the synthetic user instructions (e.g., $A_1$~$A_m$, $B_1$~$B_n$) can be evaluated, and a subset of the execution step(s) and corresponding synthetic user instructions can be selected to generate the plurality of synthetic tool-use training instances. As another example, the synthetic natural language user instructions (e.g., $A_1$~$A_m$, $B_1$~$B_n$) can be sampled (e.g., using a self-BLEU score) to select a subset of synthetic user instructions that meet a diversity threshold, where synthetic user instructions that fail to meet the diversity threshold can be removed or discarded. In this example, corresponding execution steps generated for the selected subset of synthetic user instructions can be evaluated, filtered or modified, or re-generated (using the second trained LLM or other machine learning model(s)), to form or generate the plurality of synthetic tool-use training instances.

As a non-limiting example, the plurality of synthetic tool-use training instances can include a first synthetic tool-use training instance. The first synthetic tool-use training instance can include the $m^{th}$ synthetic natural language user instruction ($A_m$) that describes the $m^{th}$ single-API task to be performed as first training instance input, and include the one or more execution steps generated (e.g., using the second trained LLM) based on the $m^{th}$ synthetic natural language user instruction ($A_m$) as a first ground truth output. Alternatively or additionally, the plurality of synthetic tool-use training instances can include a second synthetic tool-use training instance. The second synthetic tool-use training instance can include the $n^{th}$ synthetic natural language user instruction ($B_n$) that describes the $n^{th}$ multi-API task to be performed as second training instance input, and include the list of execution steps generated (e.g., using the second trained LLM) based on the $n^{th}$ synthetic natural language user instruction ($B_n$) as second ground truth output.

The preceding is presented as an overview of only some implementations disclosed herein. These and other implementations are disclosed in additional detail herein. For example, additional and/or alternative implementations are disclosed herein such as applying the plurality of synthetic tool-use training instances to train an LLM for use in parsing a user instruction to generate and/or execute a list of execution steps (e.g., in the form of API invocation calls). As another example, additional and/or alternative implementations are disclosed herein such as utilizing a trained LLM that is trained using the plurality of synthetic tool-use training instances. The trained LLM can be utilized to generate and/or execute a list of execution steps (e.g., in the form of API invocation calls) in response to receiving a user input that specifies a task performable via one or more external tools (e.g., APIs).

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 1A depicts a block diagram of an example environment that demonstrates various aspects of the present disclosure, and in which some implementations disclosed herein can be implemented.

DETAILED DESCRIPTION

Figure 1B:
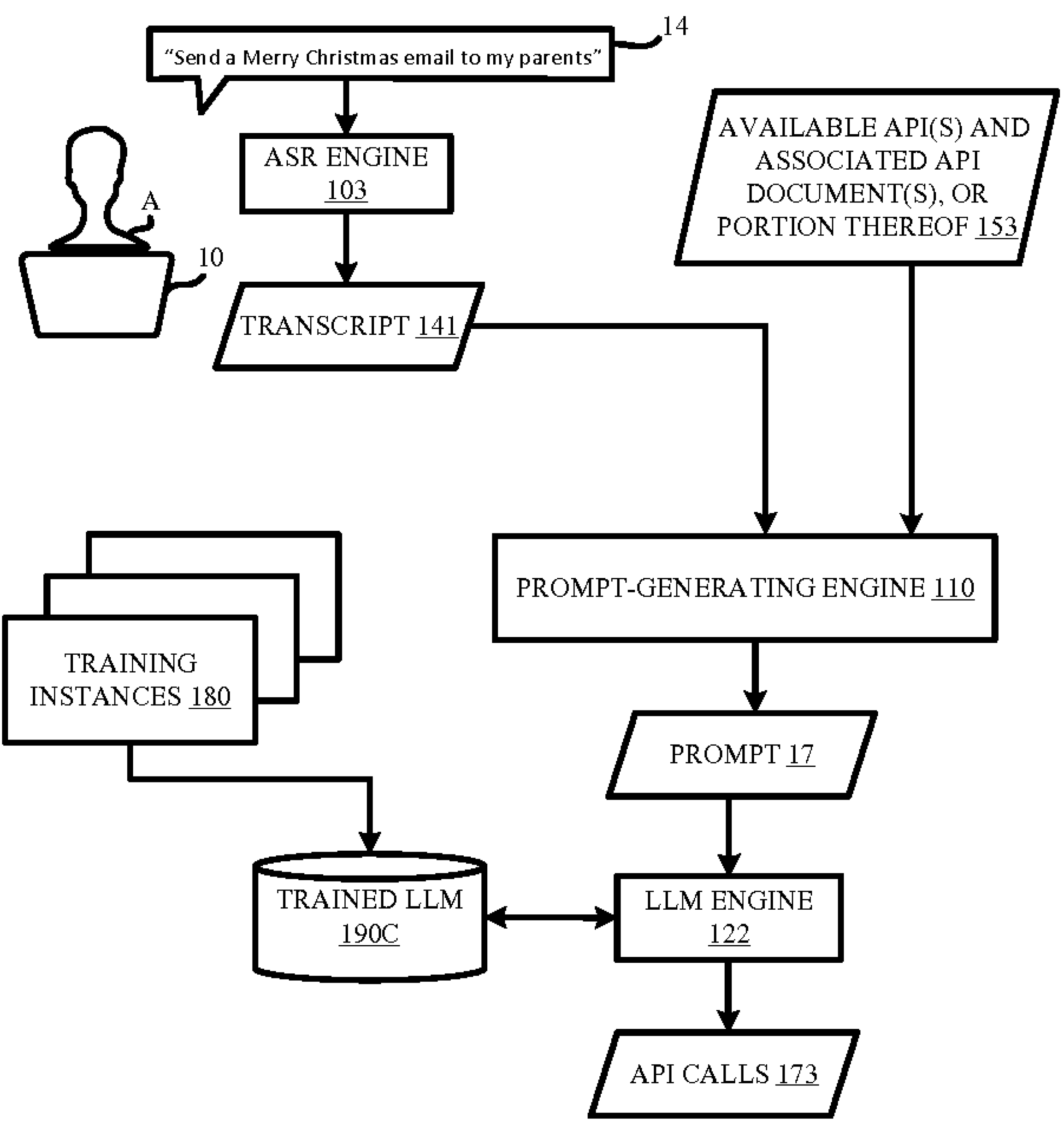
FIG. 1B illustrates an example scenario where an LLM trained to possess a tool-use capability is applied to process a command, in accordance with various implementations disclosed herein.

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device"), and a server computing device 12 ("server device") in communication with the client computing device 10 via one or more networks 13. The one or more networks 13 can include, for example, a local area network (LAN), a wide area network (WAN) such as the Internet, and/or any other appropriate network.

The client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a smart watch, a virtual or augmented reality computing device), and the present disclosure is not limited thereto.

In various implementations, the client computing device 10 can include a user input engine 101 that is configured to detect user input provided by a user of the client computing device 10 using one or more user interface input devices. For example, the client computing device 10 can be equipped with a keyboard to receive typed input, and/or a mouse (or one or more hardware buttons) to receive a user click that selects one or more graphical user interface (GUI) elements that is rendered visually at a user interface of the client computing device 10. Additionally, or alternatively, the client computing device 10 can be equipped with one or more microphones that capture audio data, such as audio data corresponding to spoken utterances of the user or other sounds in an environment of the client computing device 10. Additionally, or alternatively, the client computing device 10 can be equipped with one or more vision components that are configured to capture vision data corresponding to images and/or movements (e.g., gestures) detected in a field of view of one or more of the vision components. Additionally, or alternatively, the client computing device 10 can be equipped with one or more touch sensitive components (e.g., a stylus, a touch screen, a touch panel, etc.) that are configured to capture signal(s) corresponding to touch input directed to the client computing device 10.

In various implementations, the client computing device 10 can include a rendering engine 102, one or more applications 104 installed locally at (or otherwise accessible via) the client computing device 10, and/or a storage 106. In various implementations, the rendering engine 102 can be configured to provide content for audible and/or visual presentation to a user of the client computing device 10 using one or more user interface output devices. For example, the client computing device 10 can be equipped with one or more speakers that enable content (e.g., "task completed, do you want to check the email before sending it?") to be provided for audible presentation to the user via the client computing device 10. Additionally, or alternatively, the client computing device 10 can be equipped with a display or projector that enables content (e.g., a draft email created using a trained LLM) to be provided for visual presentation to the user via the client computing device 10. The storage 106 can store various types of files and/or data. For instance, the storage 106 can store a plurality of API documents each describing a corresponding API, and/or API descriptions (e.g., a one-sentence short description) extracted from the API documents. In some implementations, the storage 106 can store a dataset of synthetic user instructions (as described above). In some implementations, the storage 106 can store a plurality of synthetic tool-use training instances generated based on one or more synthetic user instructions from the dataset of synthetic user instructions. In some implementations, the storage 106 can store metadata (e.g., a user profile of user R, etc.) associated with the one or more applications 104 and/or associated with the client computing device 10.

In various implementations, the client computing device 10 can further include a plurality of local components. The plurality of local components can include an automatic speech recognition (ASR) engine 103 and/or a text-to-speech (TTS) engine 105. Additionally or alternatively, the plurality of local components can include a prompt-generating engine 110, and/or a LLM engine 112.

In some implementations, the one or more applications 104 can include an interactive assistant (may also be referred to as "chatbot", etc., not illustrated in FIG. 1A). The ASR engine 103, the TTS engine 105, the prompt-generating engine 110, and/or the LLM engine 112 may be (but does not necessarily need to be) included in the interactive assistant. In some implementations, a user R of the client computing device 10 may have a registered account associated with the interactive assistant and/or other application(s). The other applications can include, for example, a social media application, a video player, a note-taking application, a shopping application, a messaging application, and/or any other appropriate applications (or services), installed at (or accessible via) the client computing device 10.

The server computing device 12 can be, for example, a web server, one or more blade servers acting together to provide "cloud" infrastructure, or any other type of server as needed. In various implementations, the server computing device 12 can include cloud-based components the same as or similar to the plurality of local components installed at the client computing device 1. For example, the server computing device 12 can include a cloud-based ASR engine 123, a cloud-based TTS engine 125, a cloud-based prompt-generating engine 120, and/or a cloud-based LLM engine 122. In some implementations, the server computing device 12 can include a training instance generation engine 121. The training instance generation engine 121 can be applied to generate the aforementioned synthetic user instructions (e.g., using the aforementioned first trained LLM) and/or the plurality of synthetic tool-use training instances (e.g., using the aforementioned first or second trained LLM). The synthetic too-use training instances may sometimes be referred to as "training instances" or "synthetic training instances".

The ASR engine 103 (and/or the cloud-based ASR engine 123) can process, using one or more streaming ASR models (e.g., a recurrent neural network (RNN) model, a transformer model, and/or any other type of ML model capable of performing ASR), streams of audio data that capture spoken utterances, to generate corresponding streams of ASR output. The ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). The audio data can be acquired from audio recordings or can be generated by microphone(s) of the client computing device 10. Notably, the streaming ASR model can be utilized to generate the corresponding streams of ASR output as the streams of audio data are generated.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 103 and/or 123 can select one or more of the ASR hypotheses as corresponding recognized text ("transcript") that corresponds to the spoken utterance(s) (e.g., selected based on the corresponding predicted measures).

The TTS engine (e.g., 105 and/or 125) can process, using TTS model(s), corresponding streams of textual content (e.g., content generated based on LLM or a predetermined text, etc.) to generate synthesized speech audio data that includes computer-generated synthesized speech. In additional or alternative implementations, the synthesized speech audio data can be pre-cached in memory or in one or more databases accessible by the client computing device 10.

In some implementations, the LLM engine 112 can be in communication with one or more generative models 190 (e.g., LLM 190C in FIG. 1B), for natural language content (e.g., a natural language request to generate natural sounding user instruction) and/or other type of content (e.g., API documents for different APIs) to be processed using the generative model 190.

In some implementations, the prompt-generating engine 110 of the client computing device 10 (or the prompt-generating engine 120 of the server device 12) can be configured to generate a prompt (e.g., textual prompt) to be processed as input using one of the generative models 190. In some implementations, the prompt-generating engine 110 can be included in the LLM engine 112.

In various implementations, the one or more generative models 190 can include a large language model (LLM) having less than 100 billion parameters, more than 100 billion parameters, or over 200 billion parameters, etc. The greater the number of parameters of an LLM, the more complex (or sophisticated) a task (e.g., specified in a user query or request) the LLM can handle. The LLM may be stored at client computing device 10, or at the server computing device 12. For instance, if the memory of the client computing device 10 restricts the storing of the LLM at the client computing device 10 or if a length of a textual prompt to be processed using the LLM exceeds a predetermined token length, the LLM may be stored at the server device 12. For instance, if the memory of the client computing device 10 does not restrict the storing of the LLM at the client computing device 10, the LLM may be stored at the client computing device 10, to reduce a latency in completing a task (e.g., specified in the user query or request), for instance, by avoiding data communications via the one or more networks 13.

In some implementations, when the generative model 190 is stored at the client computing device 10, the maximum token length of content (e.g., text) processable using the LLM may be a first maximum token length (e.g., 10,000). In some implementations, when the LLM is stored at the server device 12, the maximum token length of content (e.g., text) processable using the generative model 190 may be a second maximum token length (e.g., 30,000) that is greater than the first maximum token length.

In some implementations, the LLM can be transformer-based. One non-limiting example of an LLM is GOOGLE'S Pathways Language Model (PaLM). Another non-limiting example of an LLM is GOOGLE'S Language Model for Dialogue Applications (LaMDA).

FIG. 1B illustrates an example scenario where an LLM trained to possess a tool-use capability is applied to process a command, in accordance with various implementations disclosed herein. As shown in FIG. 1B, a user A may provide a spoken utterance 14 that includes a request to perform a task performable via one or more external tools (e.g., one or more APIs). For instance, the spoken utterance 14 can be, "Send a Merry Christmas email to my parents", which specifies a task of "sending a Merry Christmas email to the user A's parents". Such task can be performable via an external tool (e.g., an email API). Audio data capturing the spoken utterance 14 can be processed using the ASR engine 103, to generate a transcript 141 of the spoken utterance 14, e.g., "Send a Merry Christmas email to my parents" in natural language.

The transcript 141 can be utilized by the prompt-generating engine 110, to generate a prompt 17. For instance, in response to receiving the transcript 141, the prompt-generating engine 110 can determine a list of available APIs and API documents for the list of available APIs (collectively "153"). As another example, the prompt-generating engine 110 can be configured to identify one or more APIs responsive to the transcript 141. For instance, the prompt-generating engine 110 can identify the one or more APIs responsive to the transcript 141 by matching the transcript 141 to each API description that is for a corresponding API from the list of available APIs. Optionally, each API description can be extracted from a corresponding API document for the corresponding API, and can be as short as one single sentence. Matching the transcript 141 to each API description can be embedding matching, where a similarity score between an embedding of the transcript 141 and an embedding of the API description is calculated. If a similarity score calculated using a API description satisfies a similarity threshold, such an API described in such API description is considered as being responsive to the transcript 141. It is noted that the term "embedding' herein means a numeric representation of text (e.g., the transcript 141 or an API description that is in natural language) in a latent space. The numeric representation can be an N-dimensional vector storing a plurality of floating numbers (e.g., hundreds of floating numbers, tens of hundreds of floating numbers, etc.) that represent semantic meanings of the text.

In some implementations, the prompt-generating engine 110 can generate the prompt 17 to include the transcript 141, the list of available APIs and API documents for the list of available APIs (collectively referred to as "153" in FIG. 1B), and/or a request to generate and execute API calls to fulfill the performance of the task (e.g., sending a Merry Christmas email to the user A's parents) determined from the spoken utterance 14. The request to generate and/or execute API calls can be, for instance, "generate execution steps (e.g., in the form of API calls) for the above user input and using one or more of the APIs listed above". As another example, the request included in the prompt 17 can be, for instance, "identify one or more APIs responsive to the user input from the above list of available APIs, and generate and execute execution steps for the user input using the one or more identified APIs". Descriptions of the request are not limited herein, and the request can include any applicable content.

In some other implementations, the prompt-generating engine 110 can generate the prompt 17 to include the transcript 141, a subset of APIs from the list of available APIs and API documents for the subset of APIs, and/or the request to generate and execute API calls to fulfill the performance of the task (e.g., sending a Merry Christmas email to the user A's parents) determined from the spoken utterance 14. In some other implementations, the prompt-generating engine 110 can generate the prompt 17 to include the transcript 141, a subset of APIs from the list of available APIs and API descriptions (which can be a portion of the API documents) for the subset of APIs, and/or the request to generate and execute API calls to fulfill the performance of the task (e.g., sending a Merry Christmas email to the user A's parents) determined from the spoken utterance 14.

In some implementations, the prompt 17 can be processed by the LLM engine 122 as input, using a trained LLM 190C, to generate one or more model outputs from which a list of execution steps can be derived. The list of execution steps can be, for instance, in the form of API calls 173. The API calls 173 can be executed so that the task from the spoken utterance 14 can be performed in response to the spoken utterance 14. For instance, given the spoken utterance of "Send a Merry Christmas email to my parents", the trained LLM 190C can be utilized to determine a set of API calls including, for instance, a first series of API calls that create and send a first email to a recipient identified as "mom" of user A. The set of API calls can further include a second series of API calls that create and send a second email to a recipient identified as "dad" of user A. The first email can be filled with content of "Merry Christmas" and includes a recipient addresses for "mom" of user A. The second email can be filled with content of "Merry Christmas" and includes a recipient email address for "dad" of user A.

For the purpose of illustration, the first (or second) series of API calls can include, for instance, an API call of creating a draft email under user A's email account, an additional API call of identifying a recipient email address of "dad" (or "mom"), a further API call of filling a body of the draft email with "Merry Christmas", and a final API call of sending out the draft email. It is noted that, optionally, one or more API calls in the first series of APIs and one or more API calls in the second series of API calls can be performed in parallel. For instance, an API call to determine (or retrieve) a recipient email address of "dad" can be executed in parallel with an API call to determine (or retrieve) a recipient email address of "mom".

In some implementations, the trained LLM 190C can be trained using a plurality of a plurality of synthetic tool-use training instances 180, the generation of which is described briefly in the summary and can be found later in this disclosure.

As described above, a single API can be identified or selected to perform the task specified in the spoken utterance 14 (or other user input), where one or more API calls directed to the single API is generated and/or executed via the trained LLM 190C. In some other implementations, multiple APIs can be identified or selected based on content of a user input (e.g., the spoken utterance 14), and a plurality of API calls directed to different APIs can be generated and/or executed via the trained LLM 190C. For instance, if the user A provides a typed input of "add the grocery items in my personal note to the shopping cart", one or more API calls directed to a first note-taking API and one or more API calls directed to a grocery-shopping API can be generated and/or executed. Optionally, the one or more API calls directed to a first note-taking API and one or more API calls directed to a grocery-shopping API can be executed in a certain order (e.g., identified based on output of the trained LLM 190C).

Optionally, generation of the set of API calls (e.g., 173) can be performed in an iterative manner, where the prompt 17 is processed using the trained LLM 190C to generate a first model output that corresponds to a first subset of API calls. The prompt 17 and the first subset of API calls are then processed using the trained LLM 190C to generate a second model output that corresponds to a second subset of API calls that are to be executed subsequent to the first subset of API calls. The prompt 17 and the second subset of APIs can be further processed . . . , and such processing can be repeated until all of the API calls 173 are generated or until a maximum number of iterations is reached.

Figure 2:
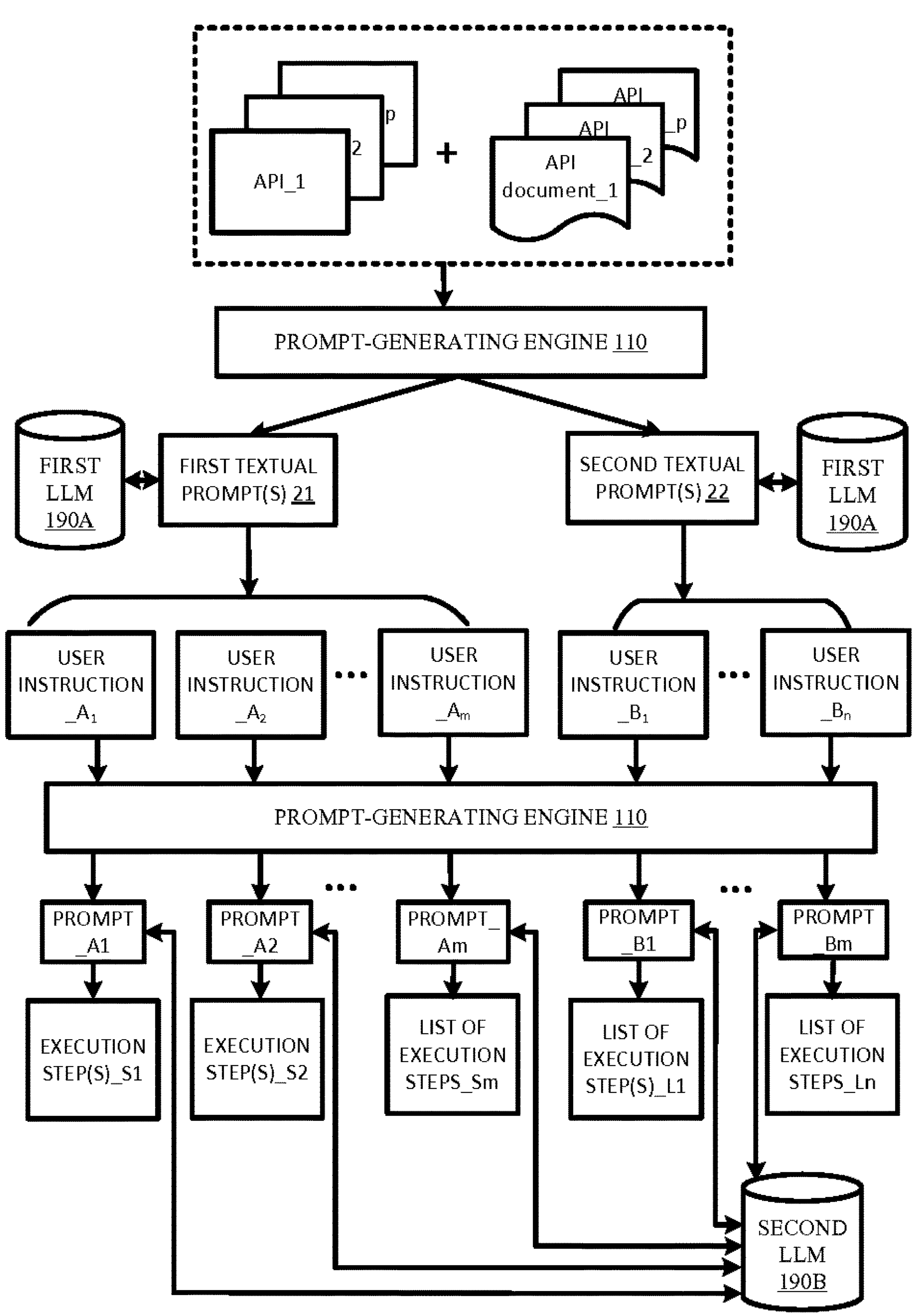
FIG. 2 depicts an example of generating synthetic data for training an LLM to possess a tool-use capability, in accordance with various aspects of the present disclosure.

FIG. 2 depicts an example of generating synthetic data for training an LLM to possess a tool-use capability, in accordance with various aspects of the present disclosure. As shown in FIG. 2, a list of APIs (e.g., API_1, API_2, . . . , and API_p, where p is an integer greater than or equal to 1) are identified or selected, and for each API in this list of APIs, a corresponding API document (e.g., API document_1, API document_2, . . . , or API document_p) that describes a respective API is identified or retrieved. The API document (e.g., API document_p) for utilization of the respective API (e.g., API_p), for instance, can be a structured documentation file that includes: a description of API endpoint(s) (also referred to as "resource(s)", which can be data object(s) such as movies, messages, or service(s)) accessible via the respective API, and a path (e.g., a uniform resource locator, "URL") to the API endpoint(s). The API document can further include an operation ID for an operation (e.g., HTTP method such as "POST", "GET", "DELETE") to be performed on the resources (which, for instance, may be accessible over HTTP protocol) of the respective API, and a parameter list that lists parameters with their names ("language", "region"), data types ("string" "integer"), and parameter descriptions. The API document can further include response format (e.g., JSON) and schema, authentication method, and/or other information (e.g., error codes and descriptions for the error codes) of the respective API.

In some implementations, the list of APIs can be (but does not necessarily need to be) divided into a first group of APIs, a second group of APIs, and/or additional group(s) of APIs. In some implementations, the first group of APIs can include one or more APIs for collaboratively performing a first task, and the second group of APIs can include one or more additional APIs for collaboratively performing a second task. The one or more additional APIs can be completely or partially different from the one or more APIs. Alternatively, the one or more additional APIs can be a subset of the one or more APIs, or vice versa. Descriptions of the list of APIs are not limited herein. For instance, the list of APIs can be APIs collected from one or more API resources (e.g., two different API resources) and can be updated based on APIs available from the one or more API resources.

In some implementations, the list of APIs can be divided using an LLM. For instance, a prompt can be generated to include the API documents of the list of APIs (or API descriptions from the API documents) and an instruction to cluster APIs into different groups to perform different tasks, and such prompt can be processed using the LLM to generate one or more model outputs each corresponding to the first group, the second group, or additional group(s) of APIs.

Given the list of APIs (e.g., API_1, API_2, . . . , and API_p) and API documents (e.g., API document_1, API document_2, . . . , or API document_p) for the list of APIs, one or more textual prompts for synthesizing user instructions can be generated. For example, referring to FIG. 2, the list of APIs (e.g., API_1, API_2, . . . , and API_p) and the associated API documents (e.g., API document_1, API document_2, . . . , or API document_p) can be forwarded to the prompt-generating engine 10. Based on the list of APIs (e.g., API_1, API_2, . . . , and API_p) and the associated API documents (e.g., API document_1, API document_2, . . . , or API document_p), the prompt-generating engine 10 can generate a first textual prompt 21 and/or a second textual prompt 22. In some implementations, the first textual prompt 21 for synthesizing user instructions can include, for instance, a request (in natural language) to generate a user instruction for performing a task using a single tool/API, in addition to the list of APIs and the API documents for the list of APIs give. Optionally, the request in the first textual prompt 21 can further include one or more manually curated seed examples that demonstrate generation of desired user instruction(s) for performing desired task(s), where each of the desired task(s) can be performed using a single tool/API. The one or more manually curated seed examples, for instance, can include a first manually curated seed example. The first manually curated seed example can demonstrate generation of a first example user instruction-"set the temperature to 70", given one or more APIs that include a thermostat API, and given API documents for the one or more APIs (which include an API document for the thermostat API).

In some implementations, the first textual prompt 21 can be modified to include different numbers of manually curated seed examples, and/or different manually curated seed examples that correspond to different example user instructions. Optionally, the manually curated seed examples included in the first textual prompt 21 can be listed in different orders. This way, the first textual prompt 21 can be modified in different ways, or multiple first textual prompts 21 can be generated, to increase the diversity of natural language user instructions (which are to each perform a single-API task) generated based on processing the first textual prompt 21.

In some implementations, the second textual prompt 22 for synthesizing user instructions can include, for instance, a request (in natural language) to generate a user instruction for performing a task using multiple tools (e.g., APIs), in addition to including the list of APIs and the API documents for the list of APIs. Give The request in the second textual prompt 22 can further include one or more additional manually curated seed examples that demonstrate generation of desired user instruction(s) for performing additionally desired task(s), where each of the additionally desired task(s) can be performed using multiple tools (e.g., APIs). The one or more additional manually curated seed examples, for instance, can include a first additional manually curated seed example. The first additional manually curated seed example can demonstrate generation of a second example user instruction-"turn on the light and set the temperature to 70", given a set of APIs (from or not from the list of APIs) that at least include a lighting API and a thermostat API, and given API documents for the set of APIs (which include an API document for the lighting API and an API document for the thermostat API).

The first textual prompt 21 for synthesizing user instructions can be processed, using a first LLM 190A, to generate one or more synthetic natural language user instructions (e.g., $A_1, A_2, \ldots, A_m$) that each describes a single-tool (e.g., single-API) task to be performed. For example, the first textual prompt for synthesizing user instructions can be processed, using the first trained LLM, for one or more iterations. During each of the one or more iterations, the first textual prompt for synthesizing user instructions can be processed as input, using the first trained LLM, to generate a corresponding synthetic natural language user instruction that describes a corresponding single-tool (e.g., single-API) task to be performed.

For instance, the first textual prompt for synthesizing user instructions can be processed, using the first LLM 190A, for a total number of m iterations. During a first iteration of the m iterations, processing the first textual prompt 21 using the first LLM 190A can result in a first synthetic natural language user instruction $A_1$ that describes a first single-API task to be performed. During a second iteration of the m iterations, processing the first textual prompt 21 using the first LLM 190A can result in a second synthetic natural language user instruction $A_2$ that describes a second single-API task to be performed . . . . During an $m^{th}$ iteration of the m iterations, processing the first textual prompt 21 using the first LLM 190A can result in an $m^{th}$ synthetic natural language user instruction $A_m$ that describes an $m^{th}$ single-API task to be performed.

In some implementations, each synthetic natural language user instruction (e.g., $A_1, A_2 \ldots, A_m$) that describes a corresponding single-API task to be performed, for instance, may not explicitly identify the single API via which the corresponding single-API task is to be performed. But this is not required, and in some cases, a synthetic natural language user instruction that describes a corresponding single-API task to be performed can explicitly identify the single API via which the single-API task is to be performed.

Alternatively or additionally, the second textual prompt 22 for synthesizing user instructions can be processed, using the first LLM 190A, to generate one or more additional synthetic natural language user instructions (B1, . . . . Bn) that each describes a multi-tool (e.g., multi-API) task to be performed. For example, the second textual prompt for synthesizing user instructions can be processed, using the first LLM 190A, for one or more iterations (e.g., n iterations). During each of the one or more iterations, the second textual prompt for synthesizing user instructions can be processed as input, using the first trained LLM, to generate a corresponding synthetic natural language user instruction that describes a corresponding multi-tool (e.g., multi-API) task to be performed.

For instance, the second textual prompt 22 for synthesizing user instructions can be processed, using the first trained LLM, for a number of n iterations, to generate a first synthetic natural language user instruction $B_1$ that describes a first multi-API task to be performed, a second synthetic natural language user instruction $B_2$ that describes a second multi-API task to be performed, . . . , and an $n^{th}$ synthetic natural language user instruction $B_n$ that describes an $n^{th}$ multi-API task to be performed. Each synthetic natural language user instruction (e.g., $B_1, B_2 \ldots, B_n$) that describes a corresponding multi-API task to be performed, for instance, may not explicitly identify the multiple APIs via which the corresponding multi-API task is to be performed. But this is not required, and in some cases, a synthetic natural language user instruction that describes a corresponding multi-API task to be performed can explicitly identify the multiple APIs via which the multi-API task is to be performed.

In some implementations, the synthetic natural language user instructions (e.g., $A_1$~$A_m$, and/or $B_1$~$B_n$) can be sampled (e.g., using a self-BLEU score) to select a subset of synthetic natural language user instructions that meet a diversity threshold, where synthetic user instruction(s) having a self-BLEU score that fail to meet the diversity threshold can be removed or discarded, and are not used to generate the plurality of synthetic tool-use training instances (e.g., 180 in FIG. 1B).

In some implementations, the first LLM 190A can be trained based on a first set of manually curated training instances. The first set of manually created training instances can each include, for instance, training instance input generated based on one or more APIs and one or more API documents respectively associated with the one or more APIs; and a ground truth natural language user instruction to perform a single-API task or multi-API task. The ground truth natural language user instruction can be curated/created by a human examiner based on reviewing the one or more APIs and the one or more API documents. Alternatively or additionally, the first LLM 190A can be trained based on in-context learning using seed examples presented in training prompts (similar to those described above as "first or second textual prompt").

In some implementations, optionally, a dataset of synthetic user instructions can be created to include the aforementioned first synthetic natural language user instruction ($A_1$) that describes a first single-API task to be performed, the second synthetic natural language user instruction ($A_2$) that describes the second single-API task to be performed, . . . , and an $m^{th}$ synthetic natural language user instruction ($A_m$) that describes the $m^{th}$ single-API task to be performed, or a selected portion thereof (e.g., selected based on self-BLEU scores). Alternatively or additionally, the dataset of user instructions can include the aforementioned first synthetic natural language user instruction ($B_1$) that describes the first multi-API task to be performed, the second synthetic natural language user instruction ($B_2$) that describes the second multi-API task to be performed, . . . , and an $n^{th}$ synthetic natural language user instruction ($B_n$) that describes the $n^{th}$ multi-API task to be performed, or a selected portion thereof (e.g., selected based on self-BLEU scores).

In some implementations, a second trained LLM 190B ("second LLM 190B") can be utilized to parse one or more synthetic user instructions from the aforementioned dataset. For instance, as shown in FIG. 2, the prompt-generating engine 110 (or another engine) can be utilized to generate a prompt $P_{A1}$ for the first synthetic natural language user instruction ($A_1$). The prompt-generating engine 110 (or another engine) can be utilized to generate a prompt $P_{A2}$ for the second synthetic natural language user instruction ($A_2$) . . . . The prompt-generating engine 110 (or another engine) can be utilized to generate a prompt $P_{Am}$ for the $m^{th}$ synthetic natural language user instruction ($A_m$). Alternatively or additionally, the prompt-generating engine 110 (or another engine) can be utilized to generate a prompt $P_{B1}$ for the first synthetic natural language user instruction ($B_1$) . . . and an $n^{th}$ prompt $P_{Bn}$ for the $n^{th}$ synthetic natural language user instruction ($B_n$).

The prompt $P_{A1}$ can be processed as input using the second trained LLM 190B, to generate one or more execution steps S1 (in order to execute a first single-tool task). The prompt $P_{A2}$ can be processed as input using the second trained LLM 190B, to generate one or more execution steps S2 (in order to execute a second single-tool task) . . . . The prompt $P_{Am}$ can be processed as input using the second trained LLM 190B, to generate one or more execution steps Sm (in order to execute an $m^{th}$ single-tool task). Alternatively or additionally, the prompt $P_{B1}$ can be processed as input using the second trained LLM 190B, to generate a list of execution steps L2 (in order to execute a first multi-tool task) . . . . The prompt $P_{Bn}$ can be processed as input using the second trained LLM 190B, to generate a list of execution steps Sn (in order to execute an $n^{th}$ multi-tool task).

The one or more execution steps (e.g., S1, S2, . . . , or Sm), for instance, can be in the form of one or more API invocation calls. The list of execution steps (e.g., L1, . . . , or Ln), for instance, can be in the form of a list of API invocation calls.

It is noted that, while FIG. 2 is illustrated to show synthetic natural language user instructions ($A_1$, $A_2$, . . . , $A_m$, $B_1$, $B_2$, . . . . $B_n$) are all parsed to determine corresponding execution steps, in various implementations, the synthetic natural language user instructions ($A_1$, $A_2$, . . . , $A_m$, $B_1$, $B_2$, . . . . $B_n$) can be filtered/sampled to select a plurality of synthetic natural language user instructions from the synthetic natural language user instructions ($A_1$, $A_2$, . . . , $A_m$, $B_1$, $B_2$, . . . . $B_n$). The selected plurality of synthetic natural language user instructions include synthetic natural language user instructions distinctly different from each other, to ensure the diversity of the training data to train an LLM in possessing or improving its capability in handling tasks that utilize external tools or APIs.

In some implementations, the list of execution steps Ln can be generated using the second trained LLM 190B in an iterative manner. For instance, the $n^{th}$ synthetic natural language user instruction ($B_n$) that describes the $n^{th}$ multi-API task to be performed, can be processed as a first prompt/input using the second trained LLM for a first iteration/time, to generate a first API call ("first execution step"). Based on the first API call, a first API response can be received/determined. The $n^{th}$ synthetic natural language user instruction ($B_n$) that describes the $n^{th}$ multi-API task to be performed, the first API call, and the first API response, can be processed as a second prompt/input using the second trained LLM for a second iteration/time, to generate a second API call ("first execution step"). Execution of the second API call can result in a second API response. The $n^{th}$ synthetic natural language user instruction ($B_n$) that describes the $n^{th}$ multi-API task to be performed, the second API call, and the second API response, can be processed as a third prompt/input using the second trained LLM for a third iteration/time, to generate a third API call ("first execution step"), using which a third API response can be determined. This process/iteration can be repeated until the $n^{th}$ multi-API task is performed or until a maximum number of iterations is reached.

In some implementations, a plurality of synthetic tool-use training instances can be generated based on the selected plurality of synthetic natural language user instructions (e.g., $A_1$, $A_2$, . . . , Ae, and/or $B_1$, . . . . Bf, where $e \leq m$, and $f \leq n$) and execution step(s) for each of the synthetic natural language user instructions from the selected plurality of synthetic natural language user instructions. For instance, the plurality of synthetic tool-use training instances can include a first synthetic tool-use training instance. The first synthetic tool-use training instance can include first training instance input generated based on the $m^{th}$ synthetic natural language user instruction ($A_m$) that describes the $m^{th}$ single-API task to be performed, and include the one or more execution steps generated based on the $m^{th}$ synthetic natural language user instruction ($A_m$) as a first ground truth output. Alternatively or additionally, the plurality of synthetic tool-use training instances can include a second synthetic tool-use training instance. The second synthetic tool-use training instance can include second training instance input generated based on the $n^{th}$ synthetic natural language user instruction ($B_n$) that describes the $n^{th}$ multi-API task to be performed, and include the list of execution steps generated based on the $n^{th}$ synthetic natural language user instruction ($B_n$) as second ground truth output.

Figure 3:
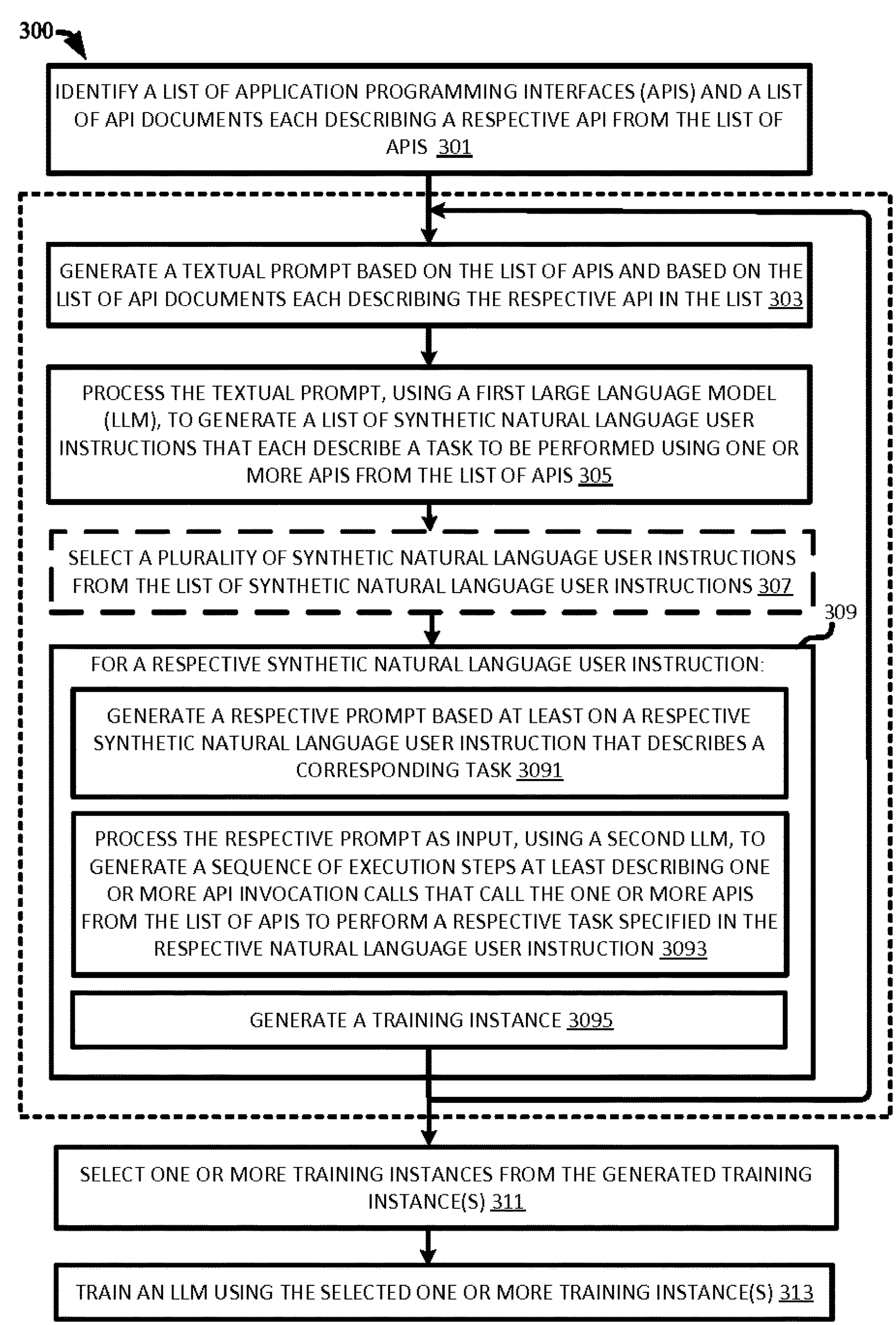
FIG. 3 depicts a flowchart illustrating an example method of generating and/or utilizing synthetic data for training an LLM to possess a tool-use capability, in accordance with various aspects of the present disclosure.

Turning now to FIG. 3, a flowchart illustrating an example method of generating synthetic data for training an LLM to possess a tool-use capability is provided, in accordance with various aspects of the present disclosure. For convenience, the operations of the method 300 are described with reference to a system that performs the operations. This system of the method 300 includes one or more processors, memory, and/or other component(s) of computing device(s) (e.g., client computing device 10 of FIG. 1, one or more servers, and/or other computing devices). Moreover, while operations of the method 300 are shown in a particular order, this is not meant to be limiting. One or more operations may be reordered, omitted, and/or added.

In various implementations, at block 301, the system can identify a list of application programming interfaces (APIs, block 3011) and a list of API documents each describing a respective API from the list of APIs. The list of APIs can be available via one or more API resources. The list of APIs, as a non-limiting example, can include a first API for retrieving data from a particular content-sharing platform. Alternatively or additionally, as another non-limiting example, the list of APIs can include a second API for sending emails.

The list of API documents, for instance, can each be a structured documentation file that includes: a description of API endpoint(s) (also referred to as "resource(s)", which can be data object(s) such as movies, messages, or service(s)) accessible via the respective API, and a path (e.g., a uniform resource locator, "URL") to the API endpoint(s). An API document can further include an operation ID for an operation (e.g., HTTP method such as "POST", "GET", "DELETE") to be performed on the resources (which, for instance, may be accessible over HTTP protocol) of the respective API, and a parameter list that lists parameters with their names ("language", "region"), data types ("string" "integer"), and parameter descriptions. The API document can further include response format (e.g., JSON) and schema, authentication method, and/or other information (e.g., error codes and descriptions for the error codes) of the respective API.

In various implementations, at block 303, the system can generate a plurality of textual prompts based on the list of APIs and based on the list of API documents each describing the respective API in the list. In some implementations, the plurality of textual prompts can each include a request or description to generate a user instruction in view of the list of APIs and the list of API documents. The request in each textual prompt can be, for instance, "generate a user instruction for performing a task using API(s) from the provided APIs".

In some implementations, the plurality of textual prompts can include a first textual prompt including: a request/description to generate a user instruction for performing a single-API task, the list of APIs, and the list of API documents. In this case, the request in the first textual prompt can be, for instance, "generate a user instruction for performing a task using a single API from the provided APIs". In some implementations, the plurality of textual prompts can include a second textual prompt including: a request/description to generate a user instruction for performing a multi-API task, the list of APIs, and the list of API documents. In this case, the request in the second textual prompt can be, for instance, "generate a user instruction for performing a task using multiple API from the provided APIs".

In some implementations, the plurality of textual prompts can each include one or more seed examples each demonstrating generation of the user instruction based on the request/description to generate the user instruction, a set of APIs, and a set of API documents each describing one of the set of APIs. The set of APIs can be the list of APIs, or can be a subset of APIs from the list of APIs. The first textual prompt can further include, for instance, a seed example (or more than one seed example) that demonstrates generation of an example user instruction to perform an example single-tool task using and only using a single API from the set of APIs. In this case, the request in the first textual prompt can be, for instance, "given the above seed example(s), generate a user instruction for performing a task using a single API from the provided APIs". The second textual prompt can include, for instance an additional seed example (or more than one seed example) that demonstrates generation of an additional example user instruction to perform an example multi-took task using more than one API from the set of APIs. In this case, request in the second textual prompt can be, for instance, "given the above seed example(s), generate a user instruction for performing a task using multiple API from the provided APIs".

In various implementations, at block 305, the system can process the plurality of textual prompts, respectively, using a first large language model (LLM), where each textual prompt can be processed for one or more iterations, to generate synthetic natural language user instructions that each describe a task to be performed using one or more APIs from the list of APIs. For instance, given a textual prompt, the given textual prompt can be processed using the first LLM to generate a list of synthetic natural language user instructions. Optionally, a plurality of synthetic natural language user instructions can be selected from the list of synthetic natural language user instructions (block 307), for instance, using a self-BLEU metrics. This can ensure that no two semantically similar synthetic natural language user instructions are selected to be included in the plurality of synthetic natural language user instructions, which increases the diversity of training data collected to train an LLM in possessing external API/tool usage capability.

In some implementations, the system processes the plurality of textual prompts, respectively, using the first LLM, to generate the plurality of synthetic natural language user instructions by: processing a first textual prompt as input, using the first LLM, to generate a first synthetic natural language user instruction that describes to perform a first task. The first synthetic natural language user instruction may or may not identify a particular API which is the only API to be used to perform the first task. In some implementations, the system processes the plurality of textual prompts, respectively, using the first LLM, to generate the plurality of synthetic natural language user instructions by: processing a second textual prompt as input, using the first LLM, to generate a second synthetic natural language user instruction that describes to perform a second task. The second synthetic natural language user instruction may or may not identify APIs used to perform the second task.

In various implementations, at block 309, for a respective synthetic natural language user instruction from the plurality of synthetic natural language user instructions, the system can: generate a respective prompt based at least on the respective synthetic natural language user instruction that describes a corresponding task (block 3091); process the respective prompt as input, using a second LLM, to generate a sequence of execution steps at least describing one or more API invocation calls that call the one or more APIs from the list of APIs to perform a respective task specified in the respective natural language user instruction (block 3093); and generate a training instance (block 3095).

In some implementations, the training instance includes: training instance input generated based on the respective synthetic natural language user instruction to perform the respective task; and the sequence of execution steps that at least describe the one or more API invocation calls to perform the respective task, as ground truth output.

In various implementations, optionally, at block 311, one or more training instances are selected from the above generated training instances. The one or more training instances can be selected, for instance, based on human evaluation that determines that execution steps in the ground truth output are executable to perform a task (e.g., single-API task, or multi-API task) specified in the corresponding synthetic natural language user instruction. Alternatively, the one or more training instances can be selected, for instance, based on determining that execution of the execution steps in the ground truth output causes the task specified in the corresponding synthetic natural language user instruction to be performed successfully. In various implementations, optionally, at block 313, the one or more selected training instances are applied to train an LLM (e.g., a pre-trained LLM).

Figure 4:
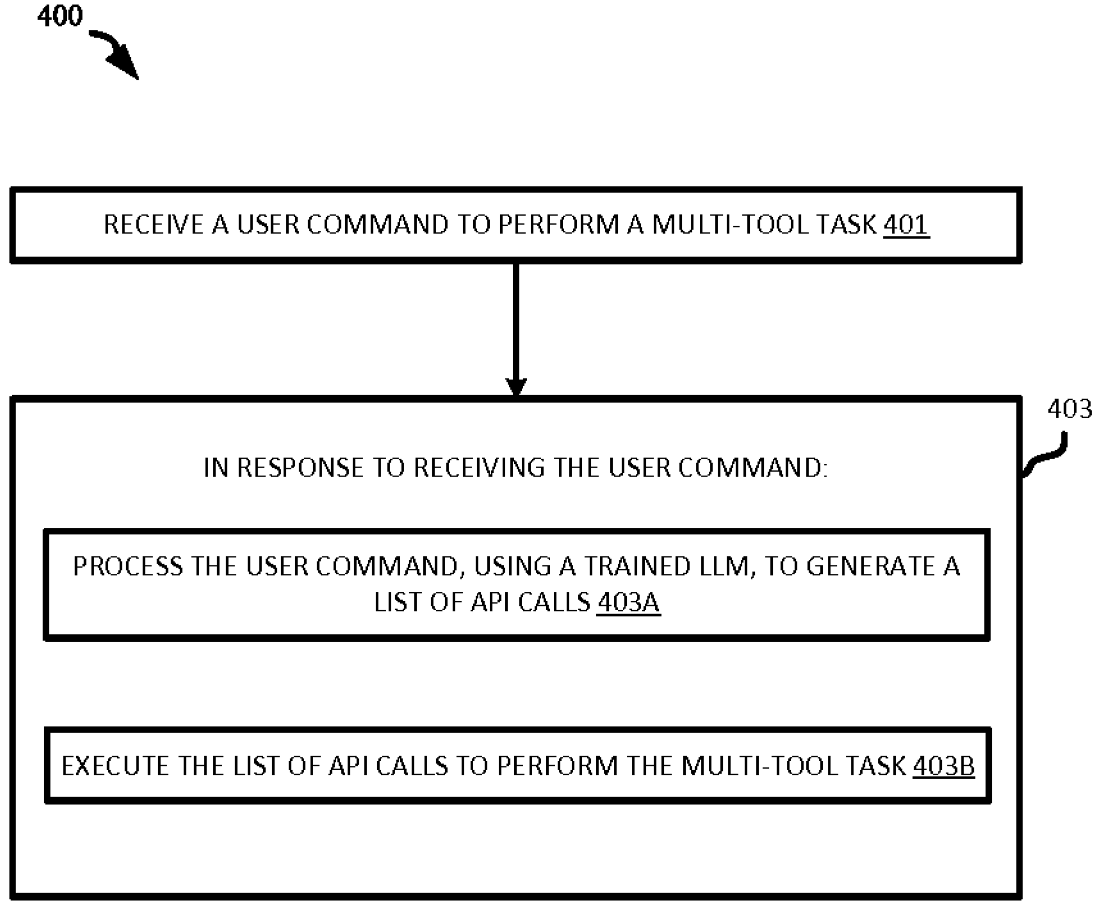
FIG. 4 depicts a flowchart illustrating another example method of applying an LLM trained to possess a too-use capability in processing a user command, in accordance with various aspects of the present disclosure.

Turning now to FIG. 4, a flowchart illustrating another example method of applying an LLM trained to possess a tool-use capability in processing a user command is provided, in accordance with various aspects of the present disclosure. This system of the method 400 includes one or more processors, memory, and/or other component(s) of computing device(s) (e.g., client computing device 10 of FIG. 1, one or more servers, and/or other computing devices). Moreover, while operations of the method 400 are shown in a particular order, this is not meant to be limiting. One or more operations may be reordered, omitted, and/or added.

At block 401, the system receives a user command to perform a multi-tool task. The user command to perform the multi-tool task can be, for instance, "send my file named 'travel plan' and save it in my online folder to my parents' email address". In this case, the multi-tool task may be completed using multiple tools/APIs, including, for instance, an email API and an "online folder" API.

At block 401, in response to receiving the user command to perform the multi-tool task, the system processes the user command using a trained LLM, to generate a list of API calls (403A); and executes the list of API calls to perform the multi-tool task (403B).

Figure 5:
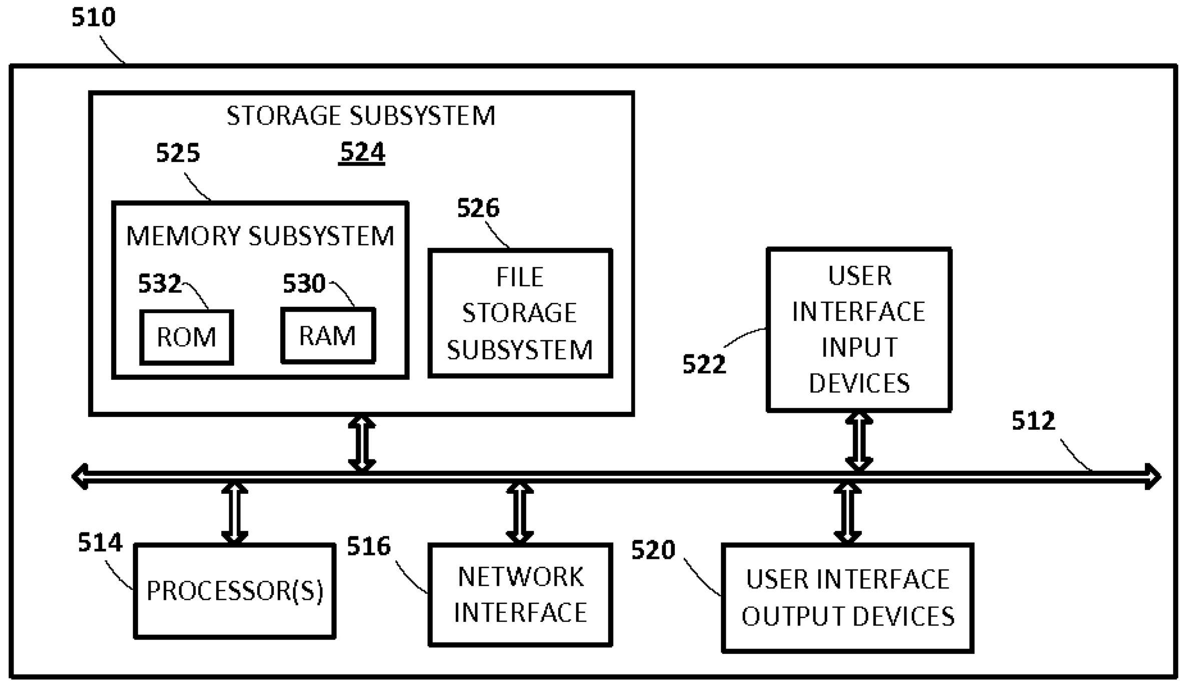
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented using one or more processors, the method comprising:

identifying a list of application programming interfaces (APIs) and a list of API documents each describing a respective API from the list of APIs;

generating a plurality of textual prompts based on the list of APIs and based on the list of API documents, wherein generating the plurality of textual prompts comprises including, in each of the plurality of textual prompts, content from one or more API documents from the list of API documents, wherein the content from the one or more API documents includes one or more of: an API endpoint, an operation identifier for an operation to be performed on the API endpoint, or a parameter list, and wherein the content is included in the plurality of textual prompts based on it being from the one or more API documents that are from the identified list of API documents;

processing the plurality of textual prompts, respectively, using a first large language model (LLM), to generate a plurality of synthetic natural language user instructions that each describe a task to be performed using one or more APIs from the list of APIs; and for a respective synthetic natural language user instruction selected from the plurality of synthetic natural language user instructions:

generating a respective prompt based at least on the respective synthetic natural language user instruction that describes a respective task, processing the respective prompt as input, using the first LLM or a second LLM, to generate a sequence of execution steps at least describing one or more API invocation calls that call a subset of APIs from the list of APIs to perform the respective task specified in the respective synthetic natural language user instruction, and generating a training instance that includes:

training instance input generated based on the respective synthetic natural language user instruction to perform the respective task, and the sequence of execution steps that at least describe the one or more API invocation calls to perform the respective task, as ground truth output.

2. The method of claim 1, wherein the plurality of textual prompts each include a request to generate a user instruction in given the list of APIs and/or the list of API documents.

3. The method of claim 1, further comprising:

selecting one or more training instances generated from respective synthetic natural language user instructions that are selected from the plurality of synthetic natural language user instructions; and training an LLM using the one or more selected training instances.

4. The method of claim 1, further comprising:

selecting a subset of synthetic natural language user instructions from the plurality of synthetic natural language user instructions, to be processed using the first or second LLM, wherein each two of the synthetic natural language user instructions from the selected subset are different from each other.

5. The method of claim 4, wherein selecting the subset of synthetic natural language user instructions is based on calculating a self-BLEU score for each synthetic natural language user instruction from the plurality of synthetic natural language user instructions with respect to all other synthetic natural language user instructions in the plurality of synthetic natural language user instructions.

6. The method of claim 1, wherein generating the plurality of textual prompts is further based on one or more seed examples each demonstrating generation of an example user instruction given a set of APIs and a set of API documents each describing one of the set of APIs.

7. The method of claim 6, wherein the set of APIs are the list of APIs or are a subset of APIs from the list of APIs.

8. The method of claim 6, wherein generating the plurality of textual prompts includes:
- generating a third textual prompt to include the one or more seed examples in a first order;
- shuffling the one or more seed examples that are listed in the first order into a second order; and
- generating a fourth textual prompt to include the one or more seed examples in the first order.

9. The method of claim 6, wherein the plurality of textual prompts includes a first textual prompt, and wherein the first textual prompt includes a first seed example that demonstrates generation of a first example user instruction to perform a first example task using and only using a single API from the set of APIs.

10. The method of claim 9, wherein processing the plurality of textual prompts, respectively, using the first LLM, to generate the plurality of synthetic natural language user instructions comprises:
- processing the first textual prompt as input, using the first LLM, to generate a first synthetic natural language user instruction that describes to perform a single-API task, the first synthetic natural language user instruction not identifying a particular API used to perform the single-API task.

11. The method of claim 6, wherein the plurality of textual prompts includes a second textual prompt, and wherein the second textual prompt includes a second seed example that demonstrates generation of a second example user instruction to perform a second task using more than one API from the set of APIs.

12. The method of claim 11, wherein processing the plurality of textual prompts, respectively, using the first LLM, to generate the plurality of synthetic natural language user instructions comprises:
- processing the second textual prompt as input, using the first LLM, to generate a second synthetic natural language user instruction that describes to perform a multi-API task, the second synthetic natural language user instruction not identifying APIs used to perform the multi-API task.

13. A system comprising one or more processors and memory storing instructions that, when executed, cause the one or more processors to perform operations of:
- identifying a list of application programming interfaces (APIs) and a list of API documents each describing a respective API from the list of APIs;
- generating a plurality of textual prompts based on the list of APIs and based on the list of API documents,
  - wherein generating the plurality of textual prompts comprises including, in each of the plurality of textual prompts, content from one or more API documents from the list of API documents,
  - wherein the content from the one or more API documents includes one or more of: an API endpoint, an operation identifier for an operation to be performed on the API endpoint, or a parameter list, and
  - wherein the content is included in the plurality of textual prompts based on it being from the one or more API documents that are from the identified list of API documents;
- processing the plurality of textual prompts, respectively, using a first large language model (LLM), to generate a plurality of synthetic natural language user instructions that each describe a task to be performed using one or more APIs from the list of APIs; and
- for a respective synthetic natural language user instruction selected from the plurality of synthetic natural language user instructions:
  - generating a respective prompt based at least on the respective synthetic natural language user instruction that describes a respective task,
  - processing the respective prompt as input, using the first LLM or a second LLM, to generate a sequence of execution steps at least describing one or more API invocation calls that call a subset of APIs from the list of APIs to perform the respective task specified in the respective sythetic natural language user instruction, and
  - generating a training instance that includes:
    - training instance input generated based on the respective synthetic natural language user instruction to perform the respective task, and
    - the sequence of execution steps that at least describe the one or more API invocation calls to perform the respective task, as ground truth output.

14. The system of claim 13, wherein the plurality of textual prompts each include a request to generate a user instruction in given the list of APIs and/or the list of API documents.

15. The system of claim 13, wherein the instructions, when executed, further causes the one or more processors to perform additional operations of:
- selecting a subset of synthetic natural language user instructions from the plurality of synthetic natural language user instructions, to be processed using the first or second LLM,
- wherein each two of the synthetic natural language user instructions from the selected subset are different from each other.

16. The system of claim 13, wherein the subset of synthetic natural language user instructions is selected based on calculating a self-BLEU score for each synthetic natural language user instruction from the plurality of synthetic natural language user instructions with respect to all other synthetic natural language user instructions in the plurality of synthetic natural language user instructions.

17. The system of claim 13, wherein the plurality of textual prompts is further generated based on one or more seed examples each demonstrating generation of an example user instruction given a set of APIs and a set of API documents each describing one of the set of APIs.

18. The system of claim 17, wherein the set of APIs are the list of APIs or are a subset of APIs from the list of APIs.

19. The system of claim 17, wherein the instructions, when executed, further causes the one or more processors to perform an operation of generating the plurality of textual prompts by:

generating a third textual prompt to include the one or more seed examples in a first order;

shuffling the one or more seed examples that are listed in the first order into a second order; and generating a fourth textual prompt to include the one or more seed examples in the first order.

20. A non-transitory storage medium comprising instructions that, when executed, cause one or more processors to perform:

identifying a list of application programming interfaces (APIs) and a list of API documents each describing a respective API from the list of APIs;

generating a plurality of textual prompts based on the list of APIs and based on the list of API documents, wherein generating the plurality of textual prompts comprises including, in each of the plurality of textual prompts, content from one or more API documents from the list of API documents, wherein the content from the one or more API documents includes one or more of: an API endpoint, an operation identifier for an operation to be performed on the API endpoint, or a parameter list, and wherein the content is included in the plurality of textual prompts based on it being from the one or more API documents that are from the identified list of API documents;

processing the plurality of textual prompts, respectively, using a first large language model (LLM), to generate a plurality of synthetic natural language user instructions that each describe a task to be performed using one or more APIs from the list of APIs; and for a respective synthetic natural language user instruction selected from the plurality of synthetic natural language user instructions:

generating a respective prompt based at least on the respective synthetic natural language user instruction that describes a respective task, processing the respective prompt as input, using the first LLM or a second LLM, to generate a sequence of execution steps at least describing one or more API invocation calls that call a subset of APIs from the list of APIs to perform the respective task specified in the respective synthetic natural language user instruction, and generating a training instance that includes:

training instance input generated based on the respective synthetic natural language user instruction to perform the respective task, and the sequence of execution steps that at least describe the one or more API invocation calls to perform the respective task, as ground truth output.

* * * * *